(12) United States Patent
Wada (10) Patent No.: US 8,425,045 B2
(45) Date of Patent: Apr. 23, 2013

(54) LIGHT SOURCE AND PROJECTOR

(75) Inventor: Susumu Wada, Matsumoto-shi (JP)

(73) Assignee: Seiko Epson Corporation, Tokyo (JP)

( * ) Notice: Subject to any disclaimer, the term of this patent is extended or adjusted under 35 U.S.C. 154(b) by 272 days.

(21) Appl. No.: 13/072,344

(22) Filed: Mar. 25, 2011

(65) Prior Publication Data
US 2011/0234993 A1 Sep. 29, 2011

(30) Foreign Application Priority Data
Mar. 29, 2010 (JP) ................ 2010-075010

(51) Int. Cl.
*G03B 21/18* (2006.01)
*G03B 21/28* (2006.01)
*F21V 29/02* (2006.01)

(52) U.S. Cl.
USPC .......... 353/60; 353/98; 362/296.01; 362/345; 362/373

(58) Field of Classification Search .......... 353/57, 353/58, 60, 61; 362/296.01–296.1, 341–350, 362/373, 231, 264
See application file for complete search history.

(56) References Cited

U.S. PATENT DOCUMENTS

| | | | | |
|---|---|---|---|---|
| 6,498,423 | B1* | 12/2002 | Bell et al. ................. | 313/24 |
| 7,210,825 | B2* | 5/2007 | Watanabe et al. ............. | 362/373 |
| 7,510,285 | B2* | 3/2009 | Takemi et al. .................. | 353/61 |
| 8,172,405 | B2* | 5/2012 | Lo et al. .................... | 353/57 |
| 8,287,135 | B2* | 10/2012 | Takezawa ...................... | 353/61 |
| 2010/0231867 | A1 | 9/2010 | Takezawa | |
| 2012/0287408 | A1* | 11/2012 | Yamashita ...................... | 353/61 |

FOREIGN PATENT DOCUMENTS

| | | |
|---|---|---|
| JP | A-2008-216727 | 9/2008 |
| JP | A-2008-218127 | 9/2008 |
| JP | A-2010-212115 | 9/2010 |

* cited by examiner

*Primary Examiner* — William C Dowling
(74) *Attorney, Agent, or Firm* — Oliff & Berridge, PLC (57) ABSTRACT

A light source includes: light-emitting portion having a discharge space in the interior thereof; an arc tube having first and second sealing portions provided on both sides of the light-emitting portion along an optical axis; a reflector arranged so that a center where the optical axis passes is located on the side of the first sealing portion with respect to the light-emitting portion and configured to reflect a luminous flux emitted from the light-emitting portion; and an air flow control unit arranged on the side of the reflector in the direction of the optical axis with respect to inflection points at a connecting portion between the light-emitting portion and the first sealing portion, extending respectively along a plane including the optical axis, and including at least two panel-shaped members extending not in parallel to each other and forming a predetermined angle.

11 Claims, 4 Drawing Sheets

LIGHT SOURCE AND PROJECTOR

CROSS-REFERENCE

The entire disclosure of Japanese Patent Application No. 2010-075010 filed Mar. 29, 2010 is expressly incorporated by reference herein.

BACKGROUND

1. Technical Field

The present invention relates to a light source having an air flow control unit for cooling a light-emitting portion and a projector employing the light source.

2. Related Art

A light source in the related art configured to prevent occurrence of devitrification or blackening in the light-emitting portion by providing a partitioning panel which divides the interior of a reflector as an internal space thereof substantially into two parts and cooling locally an upper part of an arc tube is known (see JP-A-2008-218127).

However, in the case of JP-A-2008-218127, since part of main component which is usable as illumination light in a satisfactory state out of a luminous flux emitted from the light source passes through the partitioning plate, a loss of light amount may occur while passing therethrough.

SUMMARY

An advantage of some aspects of the invention is that a light source which is capable of adequately cooling an intended part of a light-emitting portion of an arc tube by relatively restricting influence on a luminous flux emitted from the light source, and a projector employing the same are provided.

According to an aspect of the invention, there is provided a light source including: (a) a light-emitting portion having a discharge space in the interior thereof; (b) an arc tube having first and second sealing portions provided on both sides of the light-emitting portion along an optical axis; (c) a reflector arranged so that a center where the optical axis passes is located on the side of the first sealing portion with respect to the light-emitting portion and configured to reflect a luminous flux emitted from the light-emitting portion; and (d) an air flow control unit arranged on the side of the reflector in the direction of the optical axis with respect to inflection points at a connecting portion between the light-emitting portion and the first sealing portion, extending respectively along a plane including the optical axis, and including at least two panel-shaped members extending not in parallel to each other and forming a predetermined angle.

According to the light source described above, the air flow control unit includes the panel-shaped member extending along the plane including the optical axis in non-parallel to each other. In this configuration, for example, the cooling air introduced into the inside of the reflector can be adequately guided intensively to a position of the light-emitting portion where relatively high cooling effect is wanted by blasting toward the inner angle side between at least two of the panel-shaped members forming a predetermined angle. The air flow control unit is arranged on the side of the reflector with respect to the inflection points at the connecting portion between the light-emitting portion and the first sealing portion. Accordingly, probability of passage of at least the main component used as the illumination light in a good state out of the luminous flux emitted from the light source through the air flow control unit is minimized, and provability of generation of the loss of light amount due to the air flow control unit is restrained.

In a specific aspect of the invention, the air flow control unit may be arranged in an area defined by connecting a light emitting center of the arc tube and the inflection points. In this configuration, the air flow control unit can be arranged in an area other than the area where the main component of the luminous flux used as the illumination light in a good state passes.

In another aspect of the invention, the light source may further include a sub-mirror arranged on the side of the second sealing portion so as to oppose the reflector, and reflecting a part of luminous flux emitted from the arc tube toward the discharge space. In this configuration, the sub-mirror contributes to enhancing the efficiency of usage of the light.

In still another aspect of the invention, at least the two panel-shaped members of the air flow control unit may be four flat panels, and the four flat panels may be arranged around the optical axis so as to divide the space substantially uniformly. Accordingly, a point which is needed to be cooled is selected from the four points around the light-emitting portion, so that the cooling air can be blasted intensively thereto. For example, even when the point needed to be cooled is changed by vertically inverting the light source or inclining the same by 90°, it can be accommodated by changing the points where the cooling air is intensively blasted from among the spaces partitioned by the four flat panels.

According to yet another aspect of the invention, there is provided a projector configured to perform image projection by modulating light emitted from the light source according to image information and forming image light including the light source according to any of the above aspects. In this configuration, since the projector includes the light source as described above, adequate cooling is performed in the light source, and hence the luminous flux in the satisfactory state is emitted, so that the projection of the satisfactory image is achieved.

In still yet another aspect of the invention, the projector may further include a cooling apparatus configured to blast cooling air toward the reflector. In this configuration, cooling air required for cooling the light-emitting portion by the cooling apparatus can be generated.

It is preferable that the air flow control unit causes the cooling air to flow toward an upper side portion of the light-emitting portion of the arc tube, which is arranged on the opposite side from the direction of gravitational force, at the time of projection of the image. In this configuration, effective cooling can be performed for the upper side portion arranged on the side opposite from the direction of gravitational force, which is a portion of the arc tube which is subjected to devitrification or the like due to heat generation.

It is preferable that two flat panels adjacent to each other of the panel-shaped members of the air flow control unit are symmetry with respect to a plane including an optical axis and extending in parallel to the direction of gravitational force and extend away from each other from the optical axis toward the opposite direction from the direction of gravitational force. In this configuration, the supplied cooling air can be blasted intensively to the portion of the arc tube opposite from the direction of gravitational force by the two flat panels.

BRIEF DESCRIPTION OF THE DRAWINGS

The invention will be described with reference to the accompanying drawings wherein like numbers reference like elements.

DESCRIPTION OF EXEMPLARY EMBODIMENTS

Light Source

Figure 1A:
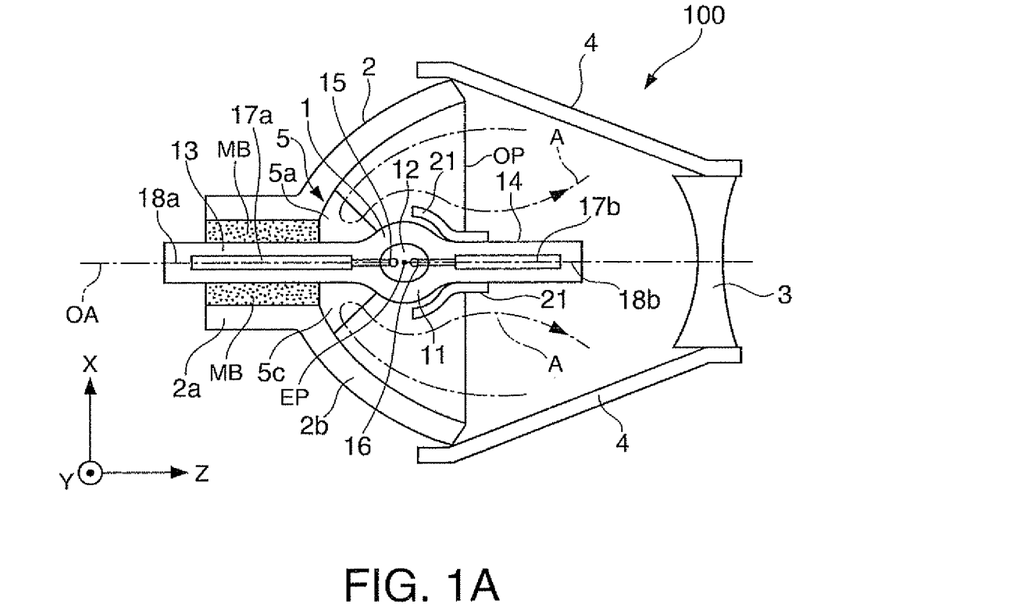
FIG. 1A is a cross-sectional view for explaining a light source according to an embodiment of the invention.

As shown in FIG. 1A, a light source 100 according to an embodiment of the invention includes an electric-discharge light emitting type arc tube 1, a reflector 2 as an oval-shaped main light-reflecting mirror, a concave lens 3 for collimation, a sub-mirror 21 as a spherical-shaped sub-light reflecting mirror, a housing 4 for storage and an air flow control unit 5 configured to form a flow channel in the periphery of the arc tube 1.

In the light source 100, the arc tube 1 is an electric-discharge light emitting type lamp such as a high pressure mercury lamp or a metal halide lamp, for example. The arc tube 1 is formed of a translucent quartz glass tube swelling at a center portion thereof into a spherical shape, and includes a light-emitting portion 11 configured to emit illumination light, and first and second sealing portions 13 and 14 extending to both sides of the light-emitting portion 11.

In the arc tube 1, in a discharge space 12 defined in the light-emitting portion 11, a distal end portion of a first electrode 15 formed of tungsten and a distal end portion of a second electrode 16 formed also of tungsten are arranged apart from each other along an optical axis OA at a predetermined distance, and mercury, rare gas, and gas containing halogen and the like are encapsulated. Metal foils 17a and 17b formed of molybdenum connected electrically to root portions of the first and second electrodes 15 and 16 are inserted into the interior of the respective sealing portions 13 and 14 extending from both ends of the light-emitting portion 11 along the optical axis OA, and the respective sealing portions 13 and 14 are hermetically sealed. When an adequate voltage is applied on lead wires 18a and 18b connected to the metal foils 17a and 17b, ark discharge occurs between a pair of the electrodes 15 and 16, and the light-emitting portion 11 emits light at a high intensity.

The reflector 2 is a main light-reflecting mirror configured to reflect light emitted from the arc tube 1 and converge the same. The reflector 2 is arranged coaxially with the arc tube 1. In other words, a rotational symmetrical axis of the reflector 2 is arranged on the same optical axis OA, that is, on an axial line of the arc tube 1. The reflector 2 is arranged rearward of the arc tube 1, that is, on the side of the first sealing portion 13. In other words, the center of the reflector 2 where the optical axis OA extends is arranged on the side of the first sealing portion 13. The center of the reflector 2 exists in a space surrounded by a concave surface of a main reflecting portion 2b on the rotational symmetrical axis of the concave surface.

The reflector 2 mainly reflects part of light emitted from the light-emitting portion 11 of the arc tube 1, that is, light emitted from the light-emitting portion 11 toward the first sealing portion 13 intensively toward the second sealing portion 14. The reflector 2 is an integrated mold formed of quartz glass, and includes a neck-shaped portion 2a through which the first sealing portion 13 of the arc tube 1 is inserted and the main reflecting portion 2b having the shape of an oval curved surface and extending from the neck-shaped portion 2a toward the +Z side. The neck-shaped portion 2a allows insertion of the first sealing portion 13 and fixation of the main reflecting portion 2b with the light-emitting portion 11 in alignment therewith by filling a gap formed with respect to the first sealing portion 13 with an inorganic adhesive agent MB. The inner glass surface of the main reflecting portion 2b is machined into the shape of the oval curved surface, and is formed with a reflecting surface on the surface thereof. An opening OP provided on the +Z side of the reflector 2 corresponds to an air-ventilation port for guiding cooling air A from an air supply port 4a of the housing 4, described later, to the periphery of the light-emitting portion 11.

The concave lens 3 is arranged coaxially with the reflector 2 so as to oppose the same. In other words, the optical axis of the concave lens 3 is arranged on the optical axis OA which matches the rotational symmetrical axis of the reflector 2. The concave lens 3 is a collimator lens configured to collimate light reflected from the reflector 2 before it exits therefrom.

The sub-mirror 21 is a sub-light reflecting mirror configured to return a luminous flux emitted forward from the light-emitting portion 11 to the light-emitting portion 11. The sub-mirror 21 includes a supporting portion 21a to be fixed to the periphery of the second sealing portion 14 and a sub-reflecting portion 21b which is supported at a root portion by the supporting portion 21a and covers the light ejecting side of the light-emitting portion 11, that is, substantially front half thereof. The sub-mirror 21 contributes to enhancing the efficiency of usage of the illumination light.

Figure 1B:
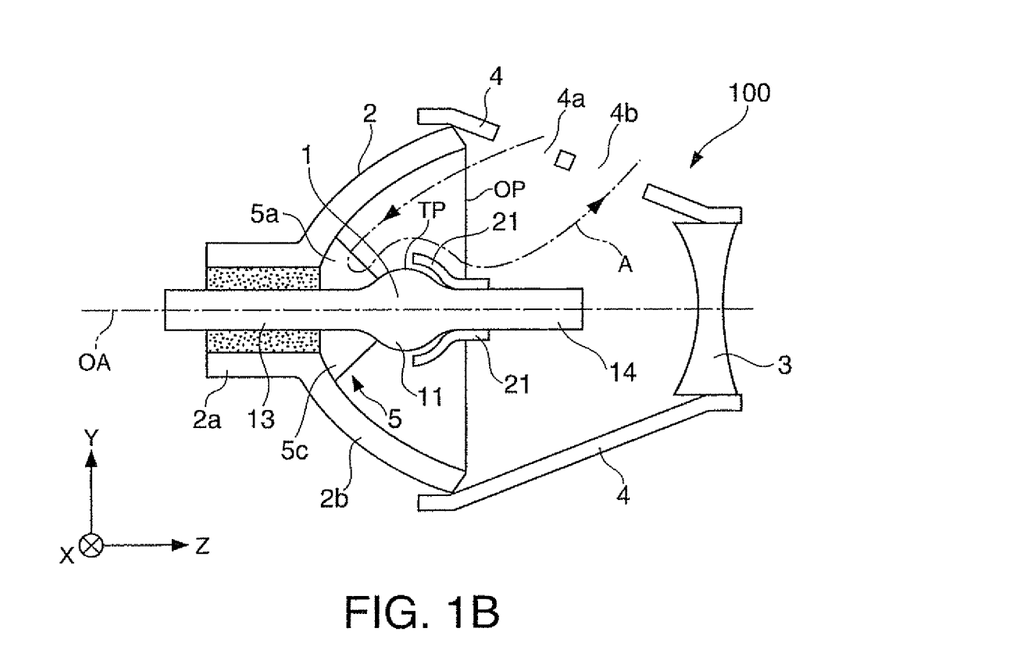
FIG. 1B is a cross-sectional view for explaining the light source according to the embodiment of the invention.

The housing 4 is formed of resin or the like, and is fixed in a state in which the reflector 2 and the concave lens 3 are aligned. The housing 4 blocks the internal space formed between the reflector 2 and the concave lens 3 from the periphery, and prevents a useless luminous flux from the arc tube 1 from leaking out as stray light. As shown in FIG. 1B, a pair of openings, that is, the air supply port 4a and an air discharge port 4b are formed on one of side walls of the housing 4, that is, a wall surface in the +Y direction. The air supply port 4a is used for intaking the cooling air A from the outside, and the air discharge port 4b is used for discharging the air after cooling to the outside. The air supply port 4a and the air discharge port 4b are arranged on the +Y side, that is, an upper side opposite from the direction of gravitational force with respect to a plane containing the optical axis OA and extending in parallel with the XZ plane. That is, the air supply port 4a and the air discharge port 4b are intended to cool mainly an upper half of the internal space of the housing 4.

Figure 2A:
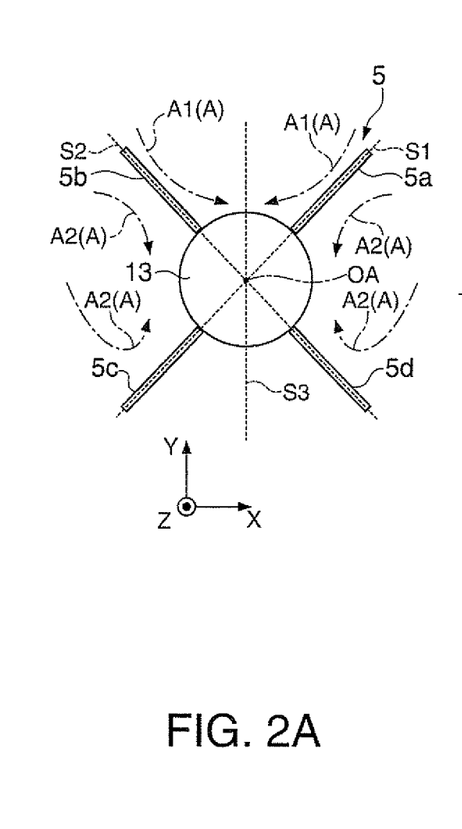
FIG. 2A is a front view for explaining a state of an air flow control unit in the light source.

The air flow control unit 5 includes four thin flat panels 5a to 5d shown in FIG. 2A, which are arranged around the first sealing portion 13. The flat panels 5a to 5d are arranged to be vertical respectively to adjacent panels and partition the space around the optical axis OA on the side of the center of the reflector 2 into four parts equidistantly. The respective flat panels 5a to 5d are thin plates formed of low-thermal expansion glass ($\alpha \leq 10\text{-}7/°$ C.) such as quartz or neoserum (trade mark) for example, and have a light-transmitting property with respect to light emitted from the arc tube 1. Since the air flow control unit 5 has the light-transmitting property, when there is light passing through the respective flat panels 5a to 5d, probability of blocking of the light can be minimized. In the manufacture of a light source 100, the respective flat panels 5a to 5d which constitute the air flow control unit 5 are temporarily fixed to predetermined positions by having a projection, not shown, which enters a clearance between the reflector 2 and the first sealing portion 13, for example, and are fixed to the predetermined position together with the arc tube 1 and the reflector 2 by filling the neck-shaped portion 2a with the inorganic adhesive agent MB.

In FIG. 1B, the light source 100 is arranged so that the direction of gravitational force corresponds to the −Y direction. Therefore, an upper portion TP of the light-emitting portion 11 of the arc tube 1, which is arranged on the opposite side from the direction of gravitational force, that is, on the +Y side, generates a largest amount of heat, and may cause devitrification. Therefore, it is desired to control the flow of the cooling air A so as to cool intensively the upper portion TP of the light-emitting portion 11.

In this configuration, the light source 100 intakes the cooling air A from the outside via the air supply port 4a provided on the +Y side of the housing 4 as shown in FIGS. 1A and 1B. The cooling air A taken in this manner is introduced into the interior of the reflector 2 from the opening OP of the reflector 2. The air flow control unit 5 causes the cooling air A introduced into the interior of the reflector 2 to turn backward and direct to the upper portion TP positioned on the +Y side of the light-emitting portion 11 of the arc tube 1 in cooperation with the inner surface of the reflector 2. Accordingly, the upper portion TP which is most liable to generate heat out of the light-emitting portion 11 which emits light is cooled by priority.

Figure 2B:
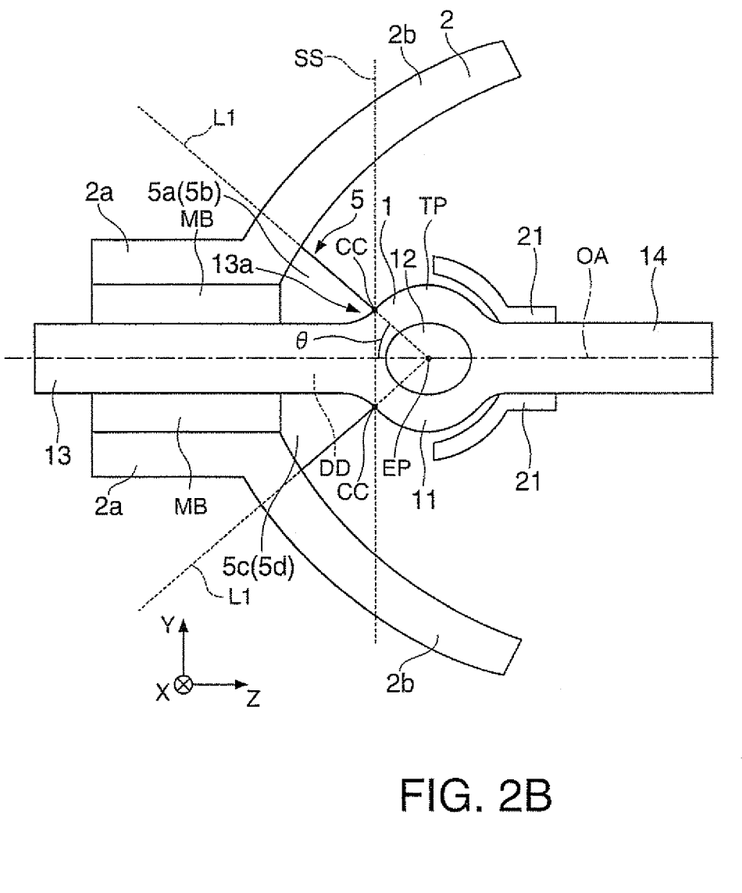
FIG. 2B is a cross-sectional view for explaining a configuration of the air flow control unit in the light source.

Referring now to FIGS. 2A and 2B, a configuration of the air flow control unit 5 for causing the cooling air A to turn backward will be described in detail. As shown in FIG. 2A, the flat panel 5a and the flat panel 5c from among the four thin flat panels 5a to 5d which constitute the air flow control unit 5 are arranged along a surface S1 so as to oppose to each other with the intermediary of the optical axis OA. The flat panel 5b and the flat panel 5d are arranged along a surface S2 so as to oppose to each other with the intermediary of the optical axis OA. The surface S1 and the surface S2 respectively include the optical axis OA, are vertical to each other, and intersect an XY plane at 45° respectively. Consequently, the adjacent ones out of the flat panels 5a to 5d intersect vertically with each other at the optical axis OA as a line of intersection. From among the flat panels 5a to 5d, specifically the flat panel 5a arranged on the +X side and the +Y side, and the flat panel 5b arranged on the −X side and the +Y side are symmetry with respect to a surface including the optical axis OA and parallel to the direction of gravitational force (−Y direction), that is, a surface S3 including the optical axis OA and parallel to the YZ plane, and extend from the optical axis OA in a V-shape away from each other in the +Y direction, which is the opposite direction from the direction of gravitational force.

The flow of the cooling air A will be described in detail below. As shown in FIG. 1A, the cooling air A is introduced from the side of the opening OP of the reflector 2, and flows from the upper side of the air flow control unit 5, that is, from the +Y side. At this time, since the air flow control unit 5 has the structure as shown in FIG. 2A, a cooling air A1 which is a main part of the cooling air A, flows into a part between the flat panel 5a and the flat panel 5b, that is, toward an inner angle formed therebetween. In the air flow control unit 5, the cooling air A1 flows along the flat panel 5a and the flat panel 5b, and hence is built up to the center side, that is, on the side of the optical axis OA. Accordingly, the cooling air A1 caused to turn backward by the flat panel 5a and the flat panel 5b, and the inner surface of the reflector 2 is blasted onto the upper portion TP, which is most liable to generate heat shown in FIG. 2B in the built-up state. A slight amount of a cooling air A2 flowing sideward, which is part of the cooling air A, flows between the flat panel 5a and the flat panel 5d or between the flat panel 5b and the flat panel 5c so as to flow along these panels. Accordingly, the cooling air A2 is caused to turn backward in a state of being built up to some extent, and cools the side portions of the light-emitting portion 11. In contrast, between the flat panel 5c and the flat panel 5d on the lower side, that is, on the −Y side, the cooling air A is blocked by the flat panels 5c and 5d, and does not flow in much. Therefore, the lower portion of the light-emitting portion 11 is prevented from being excessively cooled. Accordingly, the blackening of the lower portion of the light-emitting portion 11 can be restrained.

As shown in FIG. 2B, the air flow control unit 5 is arranged in a limited area in the vicinity of the first sealing portion 13 in the interior of the reflector 2. Accordingly, a main component of the light generated from the light-emitting portion 11 is prevented from being blocked by the air flow control unit 5.

Referring now to FIG. 2B, the position to install the air flow control unit 5 will be described further in detail. The air flow control unit 5 is positioned on the −Z side, which is close to the reflector 2 in the direction of the optical axis OA, that is, the Z direction with respect to a reference surface SS including inflection points CC of the arc tube 1. Here, the term "inflection points CC" means points existing on a curved surface of a connecting portion 13a which connects the outside shape of the light-emitting portion 11 and the outside shape of the first sealing portion 13. The inflection points CC are positions where the direction of refraction is changed when light emitted from a light-emitting center EP of the light-emitting portion 11 passes through a glass tube and then refracts when exiting from an outer peripheral surface of the light-emitting portion 11. Even when the light exiting from the side of the first sealing portion 13 with respect to the inflection points CC is reflected from the reflector 2, the optical path of the light is changed due to the refraction at the glass tube, so that the light is liable to be blocked by the arc tube 1 and become unusable light which cannot illuminate the object to be illuminated. In contrast, major part of light exiting from the side of the light-emitting portion 11 with respect to the inflection points CC becomes a component effectively used as the illumination light. As illustrated, the air flow control unit 5 is arranged on the −Z side, that is, on the side away from the light-emitting portion 11 with respect to the reference surface SS obtained by connecting the inflection points CC. Accordingly, probability of generation of the loss of light which may be an effective component as the illumination light is restrained. In addition to the configuration described above, the air flow control unit 5 is arranged in an area DD defined by connecting the light-emitting center EP and the inflection points CC. In other words, the respective flat panels 5a to 5d are arranged within the conical area DD defined by a cone formed by a generating line L1 extending from the light-emitting center EP as an apex at a predetermined angle θ with respect to the optical axis OA. The light generated in the light-emitting portion 11 is radially dispersed from the light-emitting center EP. Therefore, most part of the component used as the illumination light as described above is emitted from the +Z side with respect to the conical area DD. As described above, the air flow control unit 5 is arranged out of the area where the component used as the illumination light passes, probability of blocking of the light as described above can be minimized.

According to the description given above, the air flow control unit 5 controls the air flow using the four flat panels 5a to 5d. However, the air flow control unit 5 may include the two flat panels 5a and 5b instead of four. In other words, with the provision of at least two panel-shaped members extending in non-parallel to each other like the flat panels 5a and 5b, an air-flow control intensive to the upper side as described above is achieved. The shape of the two panel-shaped members extending in non-parallel to each other is not limited to those arranged vertical to each other as the flat panel 5a and the flat panel 5b, but may be arranged at various angles except for the parallel relationship.

In the description given above, the flat panels 5a to 5d which constitute the air flow control unit 5 are arranged on the −Z side with respect to the reference surface SS including the inflection points CC and in the conical area DD defined by connecting the light-emitting center EP and the inflection points CC. However, the air flow control unit 5 can restrain the blocking of the component effective as the illumination light as long as it is arranged in the reflector 2 on the −Z side with respect to the reference surface SS, and the air flow control panels may be arranged at different positions other than the case shown in FIG. 23 or may be changed in shape according to the flow of the cooling air.

In the description given above, the air supply port 4a and the air discharge port 4b of the housing 4 are provided only on the wall surface in the +Y direction out of the side surfaces thereof. However, for example, the air supply port 4a and the air discharge port 4b may be provided also on the wall surface on the −Y direction so as to be capable of switching the air flow between a case of blasting the cooling air A from the +Y side and a case of blasting the cooling air A from the −Y side. In this case, an adequate cooling is enabled also when the light source 100 is inverted in the vertical direction for use. In other words, when the light source 100 is inverted in the vertical direction, if the cooling air A is blasted from the −Y side in the housing 4, the flat panels 5c and 5d positioned on the −Y side from among the flat panels 5a to 5d which divide the space into four parts cause the cooling air A to turn backward intensively. Accordingly, the light-emitting portion 11 can be cooled adequately. In the same manner, it is also applicable to a case where the light source 100 is used in a state of being inclined by 90°. In addition, for example, the air supply port 4a and the air discharge port 4b of the housing 4 may be mounted rotatably on the side surface of the housing 4. In this case, when the position of the light source 100 is changed, the positions of the air supply port 4a and the air discharge port 4b can be changed correspondingly.

The light source 100 includes the sub-mirror 21 in the description, the same air flow control unit 5 may be provided in the light source which does not have the sub-mirror.

As described above, in the light source 100 according to the embodiment, the air flow control unit 5 includes the flat panels 5a and 5b which are the plate-shaped members arranged vertically to each other along the surfaces S1 and S2 including the optical axis OA. In this case, for example, the cooling air A introduced via the reflector 2 can be adequately guided intensively to the upper portion TP of the light-emitting portion 11 where relatively high cooling effect is wanted by blasting toward the inner angle side between the flat panel 5a and the flat panel 5b. The air flow control unit 5 is arranged on the side of the reflector 2 with respect to the inflection points CC at the connecting portion 13a between the light-emitting portion 11 and the first sealing portion 13. Accordingly, probability of passage of at least the main component used as the illumination light in a good state out of the light emitted from the light source 100 through the air flow control unit 5 is minimized, and provability of generation of the loss of light amount due to the air flow control unit 5 is restrained.

Figure 3A:
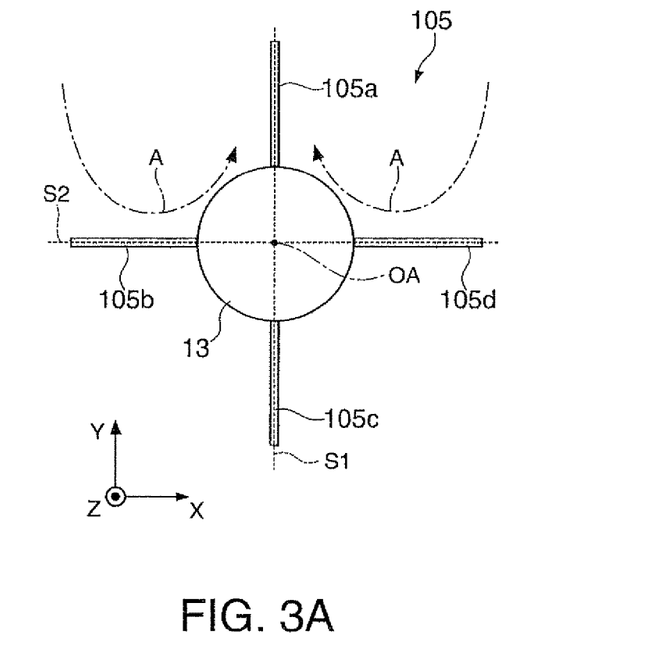
FIG. 3A is a drawing for explaining a modification of the light source.

FIG. 3A is a drawing of an air flow control unit for explaining a modification of the light source. The structures other than the air flow control unit are the same as those of the light source 100 shown in FIGS. 1A and 1B. An air flow control unit 105 shown in FIG. 3A is different from the flat panels 5a to 5d in FIG. 2A in positions of arrangement of respective flat panels 105a to 105d. In other words, the flat panel 105a and the flat panel 105c are arranged along the surface S1 including the optical axis OA and extending in parallel to the YZ plane and the flat panel 105b and the flat panel 105d are arranged along the surface S2 including the optical axis OA and extending in parallel to the XZ plane. In this case as well, the flow of the cooling air A can be controlled by the respective flat panels 105a to 105d. For example, as illustrated, the cooling air A can be blasted intensively to the upper side of the light-emitting portion 11, which is required to be cooled, by the flat panel 105a positioned on the upper side and the flat panel 105b and the flat panel 105d arranged on both sides of the flat panel 105a.

Figure 3B:
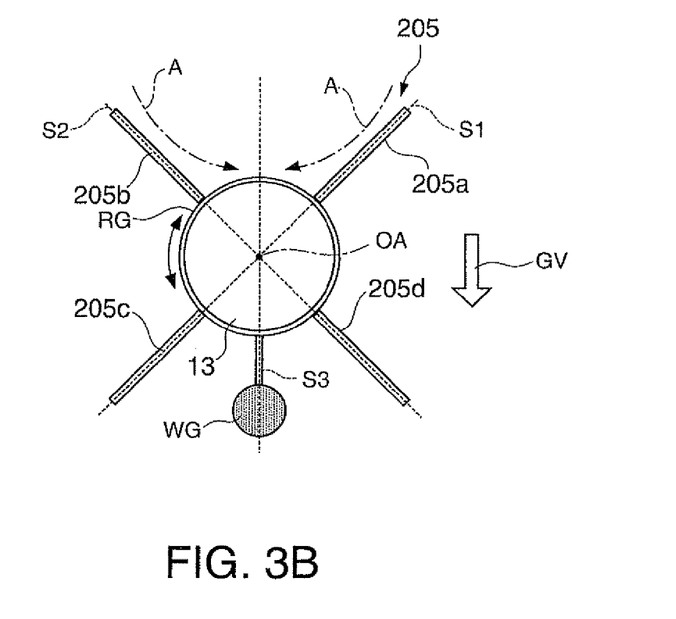
FIG. 3B is a drawing for explaining the modification of the light source.

FIG. 3B is a drawing of an air flow control unit for explaining another modification of the light source. The structures other than the air flow control unit are the same as those of the light source 100 shown in FIGS. 1A and 1B. An air flow control unit 205 as shown in FIG. 3B includes respective flat panels 205a to 205d being attached to a ring portion RG supported on the periphery of the first sealing portion 13 so as to be rotatable about the optical axis OA, and a weight WG is attached to the ring portion RG at a midsection between the flat panel 205c and the flat panel 205d. In this case, since the air flow control unit 205 is rotatable with the ring portion RG, the weight WG is maintained always on the side of a direction of gravitational force GV. Therefore, as illustrated, the flat panel 205a and the flat panel 205b of the air flow control unit 205 are always positioned on the opposite side from the direction of gravitational force GV. In this case, with the provision of the flat panel 205a and the flat panel 205b, the portion of the light-emitting portion 11 which is most liable to generate heat on the opposite side of the direction of gravitational force GV can be always cooled adequately. In this case, it is also possible to configure the panel-shaped member of the air flow control unit 205 only with two flat panels, namely, the flat panel 205a and the flat panel 205b without providing the flat panel 205c and the flat panel 205d.

In the light source 100 described thus far, the reflector 2 can be formed into a parabolic surface and, in this case, the concave lens 3 can be omitted.

Projector

Figure 4:
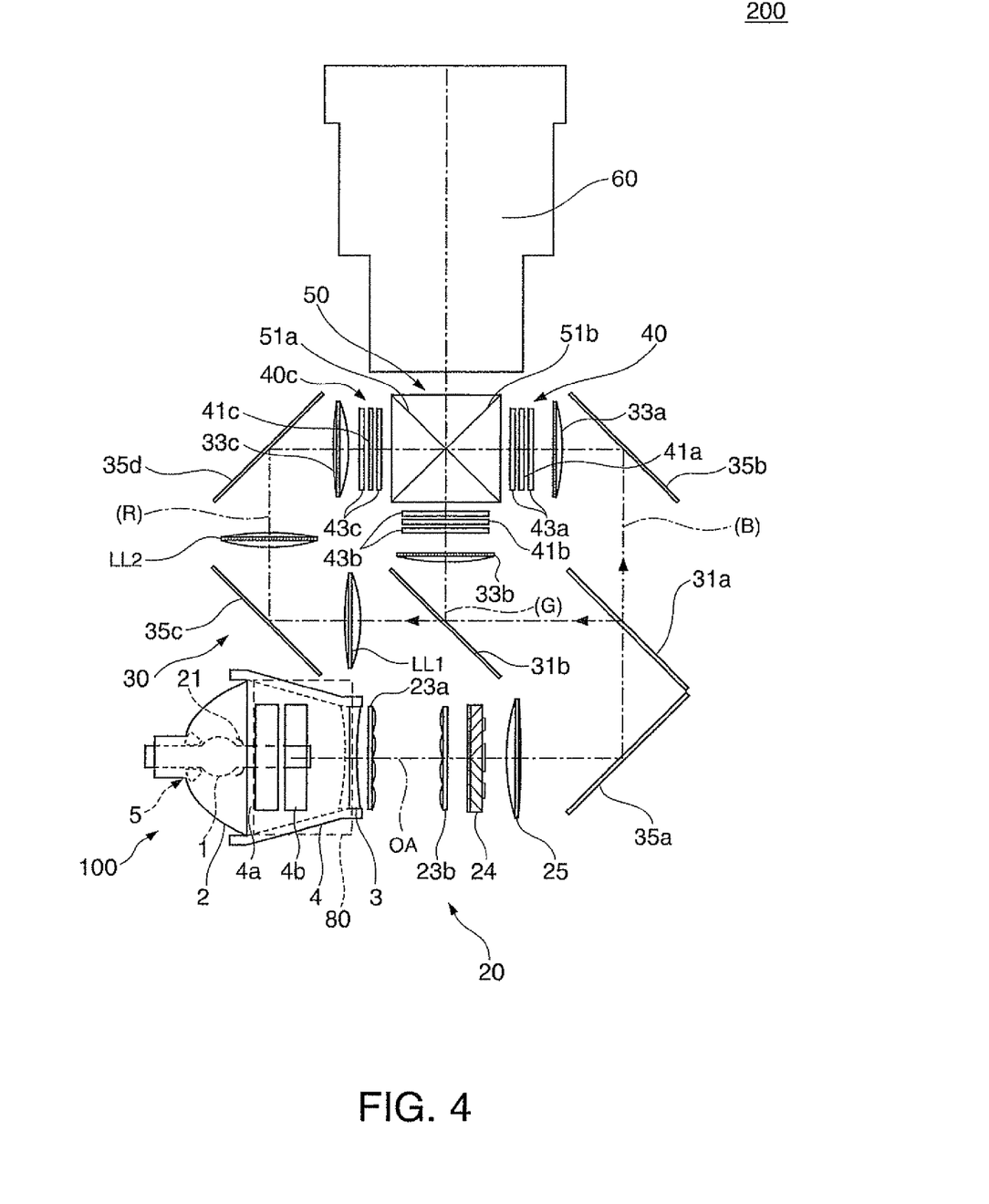
FIG. 4 is a conceptual drawing for explaining a configuration of an optical system of a projector according to the embodiment of the invention in which the light source is integrated.

FIG. 4 is a conceptual drawing for explaining a configuration of an optical system of a projector according to the embodiment of the invention. A projector 200 includes the light source 100 shown in FIG. 1A integrated therein. The projector 200 includes the light source 100, a uniformizing optical system 20 configured to uniformize and emit light source light, a color separation light guiding unit 30 configured to separate the light source light passed through the uniformizing optical system 20 into three colors, namely, red, green, and blue, a light modulating portion 40 illuminated by the light source lights in respective colors exiting from the color separation light guiding unit 30, a color combining unit 50 configured to combine image lights in respective colors from the light modulating portion 40, and a projection lens 60 which is a projection system for projecting an image light passed through the color combining unit 50 onto a screen, not shown. These components are arranged along the optical axis OA in sequence.

As described above, the light source 100 includes the arc tube 1, the reflector 2, the concave lens 3, the sub-mirror 21, the housing 4, and the air flow control unit 5. In the projector 200, a cooling fan 80, which is a cooling apparatus for blasting cooling air, is attached to the air supply port 4a for intaking the cooling air of the light source 100. The cooling fan 80 is composed of a sirocco fan or the like, for example, and blasts the cooling air A flowing as shown in FIGS. 1A and 1B into the interior of the light source 100.

The uniformizing optical system 20 includes a pair of first lens array 23a and second lens array 23b, polarization converting member 24, and a superimposing lens 25. The pair of first lens array 23a and the second lens array 23b includes a plurality of element lenses arranged in a matrix pattern, and the element lenses separate the luminous flux from the light source 100 and cause the same to converge and diffuse individually. The polarization converting member 24 aligns the polarized state of the luminous flux exiting from the second lens array 23b into an S-polarized light vertical to the paper plane and supplies the same to a downstream optical system. The superimposing lens 25 enables superimposed illumination onto liquid crystal panels 41a, 41b, and 41c for respective colors provided in the light modulating portion 40 as a light modulating device by causing the luminous flux passed through the polarization converting member 24 to generally converge as needed.

The color separation light guiding unit 30 includes first and second dichroic mirrors 31a and 31b, reflection mirrors 35a, 35b, 35c, and 35d, three field lenses 33a, 33b, and 33c, and relay lenses LL1 and LL2. Here, the first dichroic mirror 31a reflects red light and green light and allows blue light to pass therethrough out of three colors of red, green, and blue. The second dichroic mirror 31b reflects for example, green light and allows red light to pass therethrough out of incoming red and green. In the color separation light guiding unit 30, the optical path of the luminous flux of substantially white color from the light source 100 is bent by the reflection mirror 35a to enter the first dichroic mirror 31a. Then, the blue light passed through the first dichroic mirror 31a passes through the reflection mirror 35b in a state of being, for example, S-polarized light, and enters the field lens 33a. The green light reflected from the first dichroic mirror 31a and then further reflected from the second dichroic mirror 31b enters the field lens 33b in a state of being, for example, S-polarized light. The red light passed through the second dichroic mirror 31b passes through the relay lenses LL1 and LL2 and the reflection mirrors 35c and 35d in the state of, for example, being S-polarized light, and enters the field lens 33c for adjusting the incident angle.

The light modulating portion 40 includes three liquid crystal panels 41a, 41b, and 41c, and three sets of polarization filters 43a, 43b, and 43c arranged so as to interpose the respective liquid crystal panels 41a, 41b and 41c therebetween. The liquid crystal panel 41a for blue light and the pair of polarization filters 43a and 43a placed on both sides thereof constitute a liquid crystal light valve for blue light for modulating the luminance of the blue light in the luminous flux two-dimensionally on the basis of image information. In the same manner, the liquid crystal panel 41b for green light and the corresponding polarization filters 43b and 43b constitute a liquid crystal light valve for green light, and the liquid crystal panel 41c for red light and the polarization filters 43c and 43c constitute a liquid crystal light valve for red light.

Blue light separated by being reflected from the first dichroic mirror 31a of the color separation light guiding unit 30 enters the liquid crystal panel 41a for blue light via the field lens 33a. Green light separated by being reflected from the second dichroic mirror 31b of the color separation light guiding unit 30 enters the liquid crystal panel 41b for green light via the field lens 33b. Red light separated by being passed through the second dichroic mirror 31b enters the liquid crystal panel 41c for red light via the field lens 33c. The lights in three colors entering the respective liquid crystal panels 41a, 41b, and 41c are modulated according to drive signals or image signals entered into the respective liquid crystal panels 41a, 41b, and 41c as electric signals. In this case, the directions of polarization of the luminous fluxes entering the respective liquid crystal panels 41a, 41b, and 41c are accurately adjusted by the polarization filters 43a, 43b, and 43c, and component lights in the predetermined directions of polarization are taken out as image lights from the modulation lights exiting from the respective liquid crystal panels 41a, 41b, and 41c.

The color combining unit 50 is a cross dichroic prism for combining color images and includes a first dichroic filter 51a for reflecting blue light and a second dichroic filter 51b for reflecting red light arranged in an X-shape in plan view in the interior thereof. The color combining unit 50 reflects the blue light from the liquid crystal panel 41a from the first dichroic filter 51a and causes the same to exit rightward in the direction of travel, causes the green light from the liquid crystal panel 41b to travel straight ahead and exit via the first and second dichroic filters 51a and 51b, and red light from the liquid crystal panel 41c to be reflected from the second dichroic filter 51b and exit leftward in the direction of travel.

The projection lens 60 projects a color image light combined in the color combining unit 50 on a screen in a predetermined scale. In other words, color moving images or color still images having desired scales corresponding to the drive signals or the image signals entered into the respective liquid crystal panels 41a, 41b, and 41c are projected on the screen.

In the projector 200 having the configuration as described above, since the light source 100 is employed, the probability of the loss of the light amount due to the air flow control unit 5 or the like is restrained, and a satisfactory luminous flux is obtained. With the provision of the flat panels 5a and 5b arranged so as to be extended away from each other in the direction opposite from the direction of gravitational force, the air flow control unit 5 adequately cools the upper portion TP of the light-emitting portion 11 by causing the cooling air A to flow thereto, so that generation of heat is restrained. Consequently, the life of the light source 100 and hence the projector 200 is elongated.

The light source 100 of the projector 200, the air flow control units 105 and 205 shown as the modifications may be applied as the air flow control unit instead of the air flow control unit 5 shown in FIG. 2A.

In the housing 4 of the light source 100 in the projector 200, for example, even when the projector 200 is used as a suspending type which is used in a vertically inverted position by providing the air supply port 4a and the air discharge port 4b also on the wall surface in the −Y direction to allow the air to be flowed switchably from the +Y side and the −Y side, adequate cooling is enabled with the air flow control by the air flow control units 5, 105, and 205.

In the above-described projector 200, the uniformizing optical system 20 includes the pair of first lens array 23a and second lens array 23b, the polarization converting member 24, and the superimposing lens 25. However, the first lens array 23a, the second lens array 23b, and the polarization converting member 24 can be omitted. In addition, the first lens array 23a and the second lens array 23b can be replaced with a rod integrator.

Alternatively, instead of the color separation light guiding unit 30 or the light modulating portion 40, light-modulation and combining of the respective colors may be achieved by using a combination of a color wheel illuminated by the light source 100 and the uniformizing optical system 20, and a digital micromirror device irradiated with transmitted light from the color wheel.

In the description given above, the example in which the invention is applied to the transmissive projector has been described. However, the invention may be applied also to the reflective projector. The term "transmissive" means that the liquid crystal light valve including the liquid crystal panel is of a transmissive type, and the term "reflective" means that the liquid crystal light valve is of a type reflecting the light.

What is claimed is:

1. A light source comprising:
   a light-emitting portion having a discharge space in the interior thereof;
   an arc tube having first and second sealing portions provided on both sides of the light-emitting portion along an optical axis;
   a reflector arranged so that a center where the optical axis passes is located on the side of the first sealing portion with respect to the light-emitting portion and configured to reflect a luminous flux emitted from the light-emitting portion; and
   an air flow control unit arranged on the side of the reflector in the direction of the optical axis with respect to inflection points at a connecting portion between the light-emitting portion and the first sealing portion, extending respectively along a plane including the optical axis, and including at least two panel-shaped members extending not in parallel to each other and forming a predetermined angle.

2. The light source according to claim 1, wherein
   the air flow control unit is arranged in an area defined by connecting a light emitting center of the arc tube and the inflection points.

3. The light source according to claim 1, further comprising:
   a sub-mirror arranged on the side of the second sealing portion so as to oppose the reflector, and reflecting a part of luminous flux emitted from the arc tube toward the discharge space.

4. The light source according to claim 1, wherein
   at least the two panel-shaped members of the air flow control unit are four flat panels, and
   the four flat panels are arranged around the optical axis so as to divide the space substantially uniformly.

5. A projector configured to perform image projection by modulating light emitted from the light source according to image information and forming image light comprising:
   the light source according to claim 1.

6. The projector according to claim 5, wherein
   the airflow control unit is arranged in an area defined by connecting a light emitting center of the arc tube and the inflection points.

7. The projector according to claim 5, further comprising:
   a sub-mirror arranged on the side of the second sealing portion so as to oppose the reflector, and reflecting the part of luminous flux emitted from the arc tube toward the discharge space.

8. The projector according to claim 5, wherein
   at least the two panel-shaped members of the air flow control unit are four flat panels, and the four flat panels are arranged around the optical axis so as to divide the space substantially uniformly.

9. The projector according to claim 5, further comprising:
   a cooling apparatus configured to blast cooling air toward the reflector.

10. The projector according to claim 5, wherein
    the air flow control unit causes cooling air to flow toward an upper side portion of the light-emitting portion of the arc tube, which is arranged on the opposite side from the direction of gravitational force, at the time of projection of the image.

11. The projector according to claim 10 wherein
    two flat panels adjacent to each other of the panel-shaped members of the air flow control unit are symmetry with respect to a plane including an optical axis and extending in parallel to the direction of gravitational force and extend away from each other from the optical axis toward the opposite direction from the direction of gravitational force.

* * * * *